US012452748B2

(12) United States Patent
Chueh et al.

(10) Patent No.: US 12,452,748 B2
(45) Date of Patent: Oct. 21, 2025

(54) CALL INITIATION DELAY TO FACILITATE NETWORK HANDOVER

(71) Applicant: GOOGLE LLC, Mountain View, CA (US)

(72) Inventors: Han-Jung Chueh, New Taipei (TW); Chi-Wen Chung, Taoyuan (TW); Chen-Chung Chang, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 91 days.

(21) Appl. No.: 18/199,409

(22) Filed: May 19, 2023

(65) Prior Publication Data

US 2024/0388982 A1 Nov. 21, 2024

(51) Int. Cl.
*H04W 36/00* (2009.01)
*H04L 65/1016* (2022.01)
*H04L 65/1045* (2022.01)

(52) U.S. Cl.
CPC ..... *H04W 36/0079* (2018.08); *H04L 65/1016* (2013.01); *H04L 65/1045* (2022.05); *H04W 36/0019* (2023.05)

(58) Field of Classification Search
CPC ......... H04W 36/0079; H04W 36/0019; H04W 36/00222; H04W 28/0226; H04W 28/0231; H04L 65/1016; H04L 65/1045; H04L 65/1104
See application file for complete search history.

(56) References Cited

U.S. PATENT DOCUMENTS

| 2015/0163709 A1* | 6/2015 | Lee ................... H04L 65/1016 370/332 |
| 2016/0021587 A1* | 1/2016 | Vargantwar ..... H04W 36/00226 370/331 |
| 2017/0237783 A1 | 8/2017 | Yang et al. |
| 2017/0366955 A1 | 12/2017 | Edge |

(Continued)

FOREIGN PATENT DOCUMENTS

WO   WO-2022039496 A1 *  2/2022  ......... H04L 65/1069

OTHER PUBLICATIONS

Ito, Manabu et al., "IMS-based Fast Session Handover with Available Network Resources Discovery of Access Networks," Journal of Information Processing, vol. 20, No. 1; Jan. 2012; pp. 308-318.

*Primary Examiner* — Sudesh M. Patidar

(57) ABSTRACT

A user equipment (UE) is configured to implement selective call initiation delay responsive to detection of a contemporaneous handover process. When a user provides input indicating initiation of a packet-switched call, the UE determines whether there is a handover process ongoing. If not, a call initiation message (e.g., a SIP INVITE message) is transmitted without further delay. However, if a handover process is ongoing at the time of the user input, the UE refrains from promptly transmitting the call initiation message and starts a timer of a predetermined duration to provide additional time for the handover process to complete. Responsive to the timer expiring or to the handover process completing before the timer expires, the UE then promptly transmits the call initiation message to initiate establishment of the packet-switched call over whatever network to which the UE is currently attached.

19 Claims, 4 Drawing Sheets

(56) References Cited

U.S. PATENT DOCUMENTS

| | | |
|---|---|---|
| 2018/0049071 A1 | 2/2018 | Xu et al. |
| 2019/0356635 A1 | 11/2019 | Chiang et al. |
| 2020/0128449 A1 | 4/2020 | Faus Gregori et al. |
| 2020/0314155 A1* | 10/2020 | Chiang ................. H04L 1/1816 |
| 2021/0014741 A1* | 1/2021 | Hallenstål ............. H04W 48/18 |
| 2022/0086717 A1 | 3/2022 | Kostopoulos et al. |
| 2023/0362211 A1* | 11/2023 | Xu ..................... H04L 65/1096 |

* cited by examiner

CALL INITIATION DELAY TO FACILITATE NETWORK HANDOVER

BACKGROUND

Various packet-switched networks support voice calls, video calls, or other media calls by establishing an Internet Protocol Multimedia Subsystem (IMS) call (or another packet-switched call) with a user equipment (UE) via a corresponding radio access technology (RAT). For example, a voice call conducted over a wireless local area network (WLAN) (or "WiFi" (wireless fidelity) network) typically relies on an IMS call utilizing corresponding Voice-over-WiFi (VoWiFi) protocols, whereas a voice call conducted via a Third Generation Partnership Project (3GPP) Fourth Generation (4G) Long-Term Evolution (LTE) cellular network or a 3GPP Fifth Generation (5G) New Radio (NR) cellular network relies on VOLTE or VoNR protocols, respectively. Such voice calls typically are initiated by the UE in response to user input through the transmission of a Session Initiation Protocol (SIP) INVITE message to the corresponding network. This SIP INVITE message triggers a sequence of events that leads to the establishment of an IMS call between the network and the UE for supporting the voice call, typically including the network provisioning a dedicated bearer for transport and processing of the data transmitted for the voice call.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
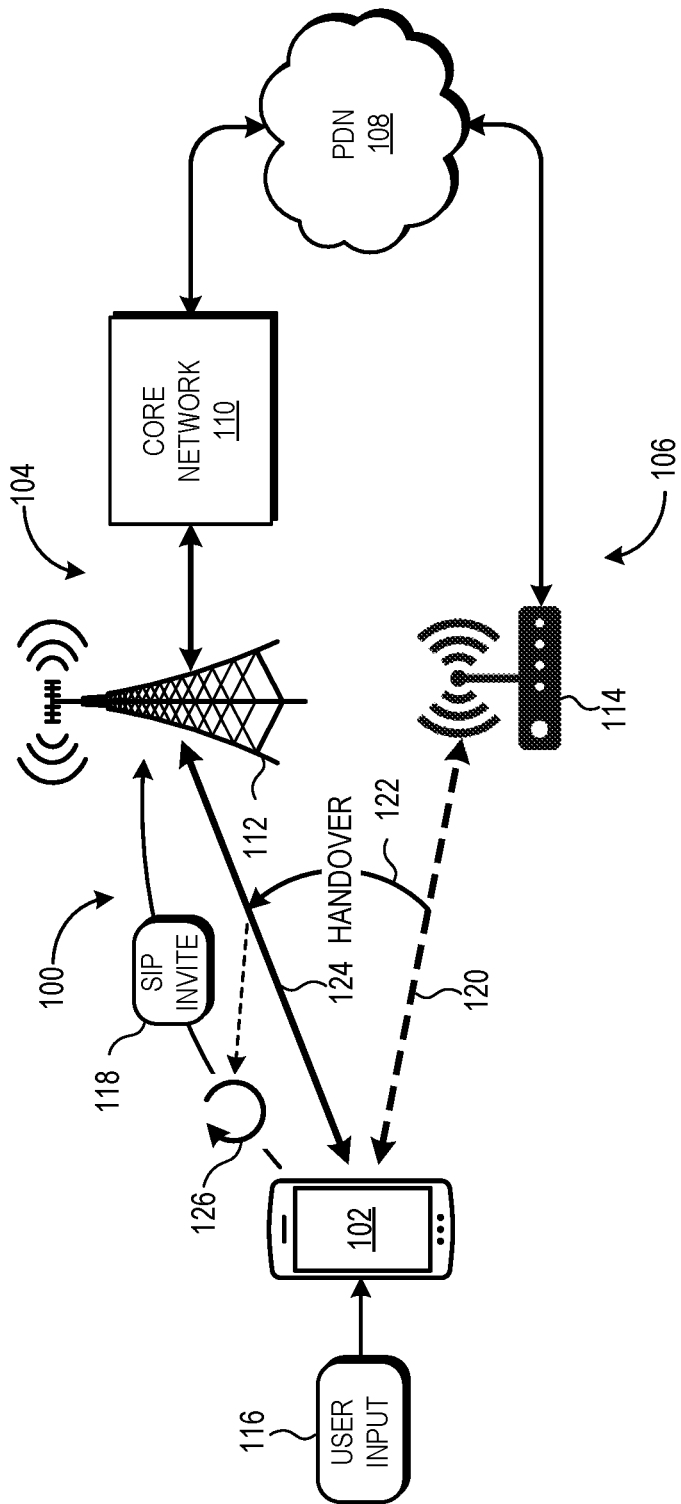
FIG. 1 is a block diagram of a system employing selective call initiation delay for contemporaneous UE handover in accordance with some embodiments.

While an IMS-enabled call may be established via one network, a UE employing multiple RATs may be able to switch between networks during an ongoing call. For example, a UE may initially connect to a WLAN network and subsequently may switch over to a cellular network (e.g., an LTE or 5G NR network) as the UE moves further out of range from the WLAN access point (AP) and closer to a base station of the cellular network or in response to other changing conditions. When such a handover process occurs after an IMS-enabled voice call is established, the handover can be conducted and processed in a straightforward manner with relatively minimal impact on the voice call. However, in some instances, the handover process and the user's initiation of a voice call may occur contemporaneously. This may result in the UE transmitting the SIP INVITE message or other call initiation message used by the UE to initiate an IMS-supported voice call over the previous network rather than the "new" network to which the UE is being handed off, which can result in the UE being unable to establish the user-initiated voice call.

For example, a user initially is indoors in proximity to a WLAN AP and thus the user's UE might be utilizing the network connectivity provided by the WLAN for IMS services. The user then moves outdoors or into a hallway to conduct a voice call, and this change in location results in reselection of, for example, a 5G NR cell as the best radio access network (RAN) for providing IMS services to the UE, and this, in turn, triggers a WLAN-to-cellular handover process to switch the connectivity of the UE from the WLAN to the 5G NR network for IMS support. Concurrently, the user manipulates the UE to initiate an IMS-based call. Accordingly, the UE transmits a call initiation message in the form of a SIP INVITE message over the WLAN, which is the current network to which the UE is attached at that point in the handover process. This results in the network initiating the process of establishing an IMS call via the WLAN, including activating a dedicated bearer for supporting the IMS call. However, when the handover completes, the UE is then connected to the 5G NR network, and if the UE does not support VONR, the network initiates an Evolved Packet System Fall Back (EPSFB) process by issuing a Radio Resource Control (RRC) Release with Redirect message, which triggers the UE to release the 5G NR connection. Moreover, the network may deactivate the dedicated bearer allocated for the call, which results in the call also dropping from any fall-back 4G LTE connection the UE may have established.

To illustrate, if the SIP INVITE message is sent via the source RAT, the UE may miss the resulting SIP 18X (180, 181, 183) message when the IMS handover is in progress because the IMS public data network (PDN) is in transition. As such, the network might send the SIP 18X message over the source RAT, but the UE has since transitioned to the target RAT. As another example, the core network may not fully synchronize the data connection between the source RAT and target RAT, and thus the default EPS bearer for IMS may be identified as not existing after the handover, which would cause the call to terminate.

Accordingly, disclosed herein are systems and techniques for facilitating packet-switched call establishment even when a call is initiated during a handover process. In at least one embodiment, a UE is configured to implement a delay before sending out the call initiation message that would be triggered by a user's initiation of a voice call when the UE detects that the voice call initiation is occurring during a handover process. This delay is intended, at least in part, to provide sufficient time for the handover process to complete, and thus allow the call initiation message to be transmitted by the UE via the network to which the UE is attached following the handover process, and thus avoiding the issues resulting from a conventional configuration in which a UE immediately sends a call initiation message in response to a user call initiation and without regard for whether a potential handover process is occurring at the same time. For ease of illustration, these systems and techniques are described in an example context in which the call initiation message is a SIP INVITE message in accordance with the Session Initiation Protocol, but it will be understood that reference to SIP INVITE message likewise applies to other forms of call initiation messages using the guidelines provided herein.

FIG. 1 illustrates a cellular communications system 100 employing selective call initiation message delay during call initiation in accordance with some embodiments. As shown, the system 100 includes a user equipment (UE) 102 and multiple UE-facing networks, such as the illustrated cellular infrastructure network 104 and wireless local area network (WLAN) 106. The multiple UE-facing networks, in turn, are connected to at least one public data network (PDN) 108 or another larger-scale network, such as the Internet. The UE 102 can include any of a variety of electronic wireless communication devices, such as a cellular phone, a cellular-enabled tablet computer or cellular-enabled notebook computer, a cellular-enabled watch or another wearable device, an automobile or other vehicle employing cellular services (e.g., for navigation, provision of entertainment services, in-vehicle mobile hotspots, etc.), a cellular access point (or "hot spot), and the like.

The cellular infrastructure network 104 includes a core network 110 and a plurality of edge networks, or radio access networks (RANs), connected via a backhaul infrastructure. Each edge network includes at least one base station 112 operable to wirelessly communicate with UEs within signal range based on one or more radio access technologies (RATs). Examples of the base station 112 include, for example, a NodeB (or base transceiver station (BTS)) for a Universal Mobile Telecommunications System (UMTS) RAN implementation (also known as "3G"), an enhanced NodeB (eNodeB) for a 4G LTE RAN implementation, a 5G Node B (gNB) for a 5G NR RAN implementation, and the like. As is well known in the art, the base station 112 operates as an "air interface" to establish radio frequency (RF) wireless connections with UEs, and these wireless connections (or "links") then serve as data and voice paths between the UEs and the core networks 110 for providing various services to the UEs, including voice services via circuit-switched networks or packet-switched networks, messaging services such as simple messaging service (SMS) or multimedia messaging service (MMS), multimedia content delivery, presence services, and the like. For ease of illustration, the base station 112 is described in various scenarios below as a 5G NR radio access network (RAN), and thus is a gNB in such scenarios. However, it will be appreciated that the base station 112 is not limited to this example configuration and instead, could be, for example, a 4G LTE RAN (e.g., an eNB). The core network 110 comprises one or more servers, switches, sub-networks, and other components to provide services to the UE 102 as well as to act as a bridge and transport between the UE 102 and the PDN 108. This can include, for example, one or more IMS servers (not shown) to provide IMS services for the UE 102, such as IMS services for conducting a voice call between the UE 102 and another UE in the same or different network. The WLAN 106 includes one or more WLAN APs 114, which operates as the interface between a connected UE (such as the UE 102) and the PDN 108, which in turn provides connectivity to the core network 110 and its various components, including IMS servers and other IMS-supporting components.

In operation, the UE 102 selects an appropriate network and initiates the process to camp on the selected network. If the network is a cellular network, this includes the transmission of an RRC Connection Request message, which then triggers a sequence of processes and back-and-forth communications between the core network 110 and the UE 102, including the authentication of an identity of the user, exchange of capability information, setup and allocation of one or more dedicated bearers, a Proxy-Call Session Control Function (P-CSCF) discovery process, and the like. Once camped on a network, a user of the UE 102 can manipulate the UE 102 via a graphical user interface (GUI), physical buttons, voice commands, or the like, to initiate a packet-switched call with another UE. This user input 116 triggers the UE 102 to attempt to establish a packet-switched call (that is, an IMS call) via IMS services provided by the core network 110. The call establishment process is initiated at the UE 102 with the transmission of a SIP INVITE message, such as SIP INVITE message 118, from the UE 102 to the core network 110 via the UE-facing network on which the UE 102 is currently camped. For example, if camped on the cellular infrastructure network 104, then the UE 102 would send the SIP INVITE message to the base station 112 for forwarding to the core network 110. If camped on the WLAN 106, then the UE 102 would send the SIP INVITE message to the WLAN AP 114 for forwarding to the core network 110 via the PDN 108. The SIP INVITE message triggers a sequence of processes, including authentication/verification of the identity associated with the UE 102, IP discovery, codec identification, and the like. Once the IMS call is established and the two UE are connected, the UE 102 and the other UE may conduct the call (which may be a voice call, a video call, etc.).

As noted above, a UE may be switched between networks using a handover process. If the handover process occurs for the UE 102 while a call already is established, processes are in place to affect a relatively seamless transition between networks typically without significant impact to the call itself. However, in the event that the handover process is ongoing when the call is initiated, there is potential for the UE 102 to transmit the SIP INVITE request to the previous network while being handed over to the "new" network, which can trigger call failure for at least the reasons outlined above. Accordingly, in at least one embodiment, the UE 102 implements a call initiation delay process in situations in which an ongoing handover process is detected contemporaneously with the initiation of an IMS call at the UE 102. As a general overview, the call initiation delay process selectively employs a predetermined timer delay before sending out a SIP INVITE message 118 after call initiation depending on whether an ongoing handover process for the UE 102 is present. Thus, in the absence of a contemporaneous ongoing handover process, the UE 102 is configured to transmit the SIP invite message promptly as consistent with conventional IMS call establishment procedures. However, if a contemporaneous handover process is detected, the UE 102 starts a SIP invite delay timer (FIG. 4) and is configured to wait until the later of completion of the handover process or expiry of the SIP invite delay timer to send out the SIP INVITE message.

To illustrate, FIG. 1 illustrates an example operation in which the UE 102 is initially attached 120 to the WLAN 106. At some later time, a WLAN-to-cellular handover process 122 is initiated to handover the UE 102 so as to attempt to attach 124 to the cellular infrastructure network 104. Concurrently, a user provides the user input 116 to initiate an IMS call, such as a voice or video call, via the UE 102. In response to detecting that the handover process 122 is ongoing, rather than immediately sending the SIP INVITE message 118, the UE 102 instead starts a delay timer and monitors both the delay timer and the handover process 122. In response to expiry 126 of the delay timer (or in response to completion of the handover process 122 if it occurs before expiry 126), the UE 102 then transmits the heretofore-delayed SIP INVITE message 118 on the current network to which it is attached. If the handover process 122 is completed successfully by expiry 126 of the delay timer, the SIP invite message 118 would then be transmitted over the "new" cellular infrastructure network 104 to which the UE 102 is now attached due to the handover process 122. If the handover process 122 is not completed successfully by expiry 126 of the delay timer, the SIP invite message 118 would then be transmitted over the WLAN 106. As such, selection of the duration of the delay timer can include consideration of the typical time required to complete the handover process 122. To illustrate, if a typical WLAN-to-cellular handover can be completed in 3 seconds, the delay timer may be set to, for example, 6-7 seconds so as to provide an additional buffer in the event that there are any complications in the handover process. Such a duration also provides sufficient time for a handover process to fail, and thus still allow the call to be initiated via the SIP INVITE message over the original network to which the UE is still likely attached by virtue of the failed handover.

Figure 2:
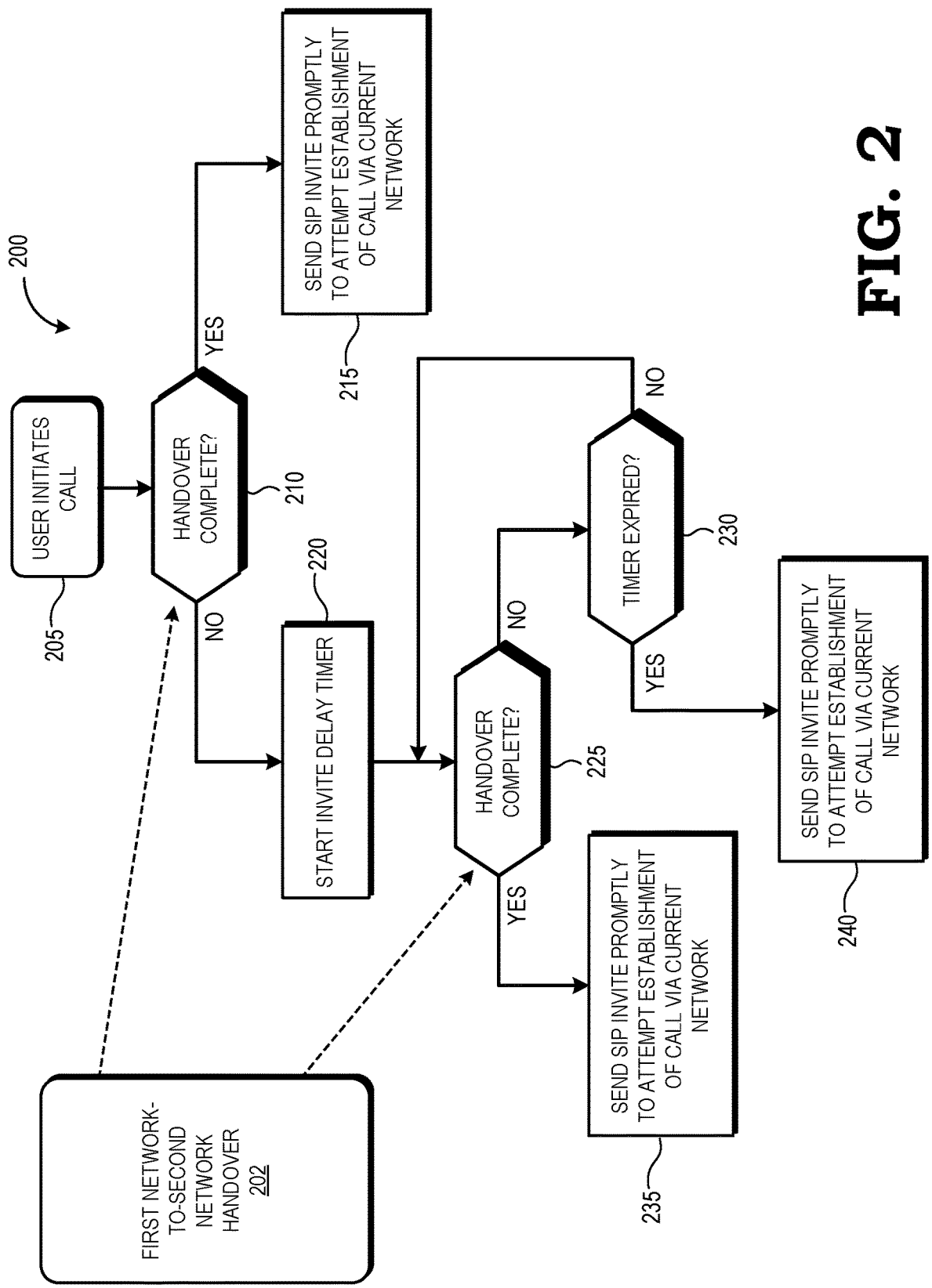
FIG. 2 is a flow diagram illustrating one implementation of a selective call initiation delay process employed by the UE of FIG. 1 in accordance with some embodiments.

FIG. 2 is a flow diagram illustrating an example method 200 for implementing the selective call initiation delay process in accordance with some embodiments. The method 200 initiates at block 205 with receipt of user input 116 indicating the user's desire to initiate an IMS call via the UE 102. Contemporaneously with this user input, a handover process 202 (e.g., the WLAN-to-cellular handover process 122, FIG. 1) is initiated and in which an attempt to handover the UE 102 from a first network (e.g., network 106) to a second network (e.g., network 104). In response to the user input 116, the UE 102 prepares to transmit a SIP INVITE message. However, to avoid a potential misdirection of the SIP INVITE message, before sending the SIP INVITE message the UE 102, at block 210, determines whether the handover process 202 has been completed, or finished. Note that the handover process 202 can be completed without being successful; that is, in some instances the handover process 202 can be completed without successfully handing over the UE 102 from the first network to the second network, such that the UE 102 remains on the second network after completion of the handover process 202. To illustrate, completion of the handover process 202 may be signaled via a SIP 200 message ("OK") from the core network in response to completion of the IMS re-registration process that typically is part of a handover process, or via a SIP 400 message ("unauthorized") from the core network to signal that the UE should request an initial IMS register on the new network.

If the UE 102 determines that the handover process 202 has been completed when the UE 102 is first ready to transmit the SIP INVITE message 118, then at block 215 the UE 102 proceeds with an attempt to initiate establishment of an IMS call by promptly transmitting the SIP INVITE message 118 to the core network 110 via the current network on which the UE 102 is camped; that is, by transmitting the SIP INVITE message 118 with no further delay intended to accommodate the handover process 202. If the handover was successful, this would be the second network, and if the handover was unsuccessful, this would be the first network. The processing of the SIP INVITE message 118 by the core network 110 and the attempt to establish an IMS call then proceeds according to conventional processes.

If the UE 102 instead determines that the handover process 202 has not been completed when the UE 102 is first ready to transmit the SIP INVITE message 118, then at block 220 the UE 102 refrains from promptly transmitting the SIP INVITE message 118 and instead starts an invite delay timer (see, e.g., invite delay timer 444, FIG. 4) with a predetermined timer duration that, in some embodiments, is selected to exceed the typical handover process duration by some spare amount. For example, if the average handover process takes 3 seconds, the invite delay timer can be configured to start with a 7-second timer duration. With the invite delay timer started, the UE 102 monitors both the status of the handover process 202 (block 225) and the status of the invite delay timer (block 230). In the event that the handover process completes before the invite delay timer expires ("NO" at block 230 and "YES" at block 225), then at block 235 the UE 102 transmits the SIP INVITE message responsive to, and promptly following, detecting completion of the handover process over whatever network to which the UE 102 is currently attached. Thus, if the handover was successful, the SIP INVITE message is transmitted over the second network, whereas if the handover is unsuccessful, the SIP INVITE message is transmitted over the first network. The SIP INVITE message in then processed in accordance with the corresponding protocols and standards in an attempt to establish the IMS call via the current network.

Otherwise, the UE 102 continues to monitor the invite delay timer, and when the invite delay timer expires and the handover process is still incomplete ("NO" at block 225 and "YES" at block 230), then the UE 102 proceeds to avoid any further delay in establishing the IMS call by transmitting the SIP INVITE message responsive to, and promptly following, detecting expiry of the invite delay timer over whatever network to which the UE 102 is currently attached. Thus, if the UE 102 remains effectively "attached" to the first network at the point in the handover process when the timer expired, the SIP INVITE message is transmitted over the first network, whereas if the UE 102 has effectively transitioned to the second network at that point in the handover process, then the SIP INVITE message is transmitted over the second network. The SIP INVITE message is then processed in accordance with the corresponding protocols and standards in an attempt to establish the IMS call via the current network.

Figure 3:
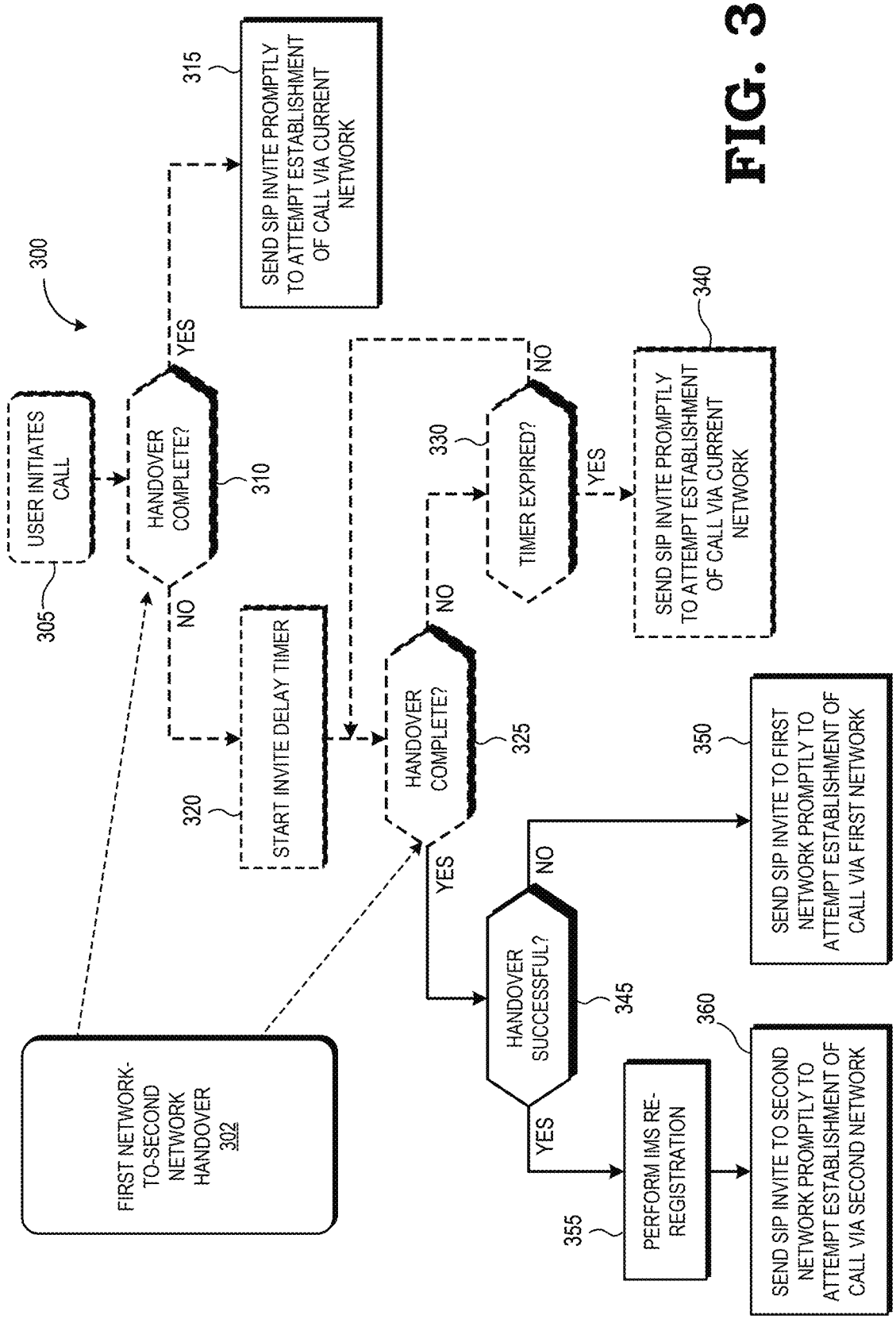
FIG. 3 is a flow diagram illustrating another implementation of the selective call initiation delay process employed by the UE of FIG. 1 in accordance with some embodiments.

FIG. 3 is a flow diagram illustrating another example method 300 for implementing the selective call initiation delay process in accordance with some embodiments. The method 300 initially proceeds in the same or similar manner as the processes of blocks 202, 205, 210, 215, 220, 225, 230, 230, and 240 of method 200 of FIG. 2, with the performance of a handover process 302 for attempting a handover from a first network to a second network contemporaneously with user input to initiate an IMS call (block 305), an initial check to determine the status of the handover process (block 310), prompt transmission of a SIP INVITE message if the handover process is complete (block 315) or otherwise starting the invite delay timer (block 320), and monitoring the handover process (block 325) and status of the invite delay timer (block 330), and sending the SIP INVITE message promptly if the invite delay timer expires before the handover process is complete (block 340).

However, the method 300 further provides for adaptation of the selective call initiation process to reflect the status of a complete handover process. Accordingly, in response to detecting that the handover process has completed ("YES" at block 325 and "NO" at block 330), the UE 102 determines at block 345 whether the handover process was successful; that is, was the UE 102 successfully switched to the second network. If not, then at block 350 the UE 102 likely remains attached to the first network and thus the UE 102 avoids further delay in establishing the call by promptly transmitting the SIP INVITE message to the first network for further processing. Otherwise, if the handover process is determined at block 350 to have been completed successfully, then the UE 102 presumably is now attached to the second network. Accordingly, in order to ensure the handover process is fully complete and to ensure the IMS server is aware that the UE 102 is now attached to the second network, at block 355 the UE 102 determines whether an IMS re-attach process has been performed in order to ensure the handover process is fully completed, and if not, initiates the IMS re-attach process. Then, at block 360, the UE 102 promptly transmits the SIP INVITE message via the second network so as to initiate the process of establishing an IMS call via the second network.

Figure 4:
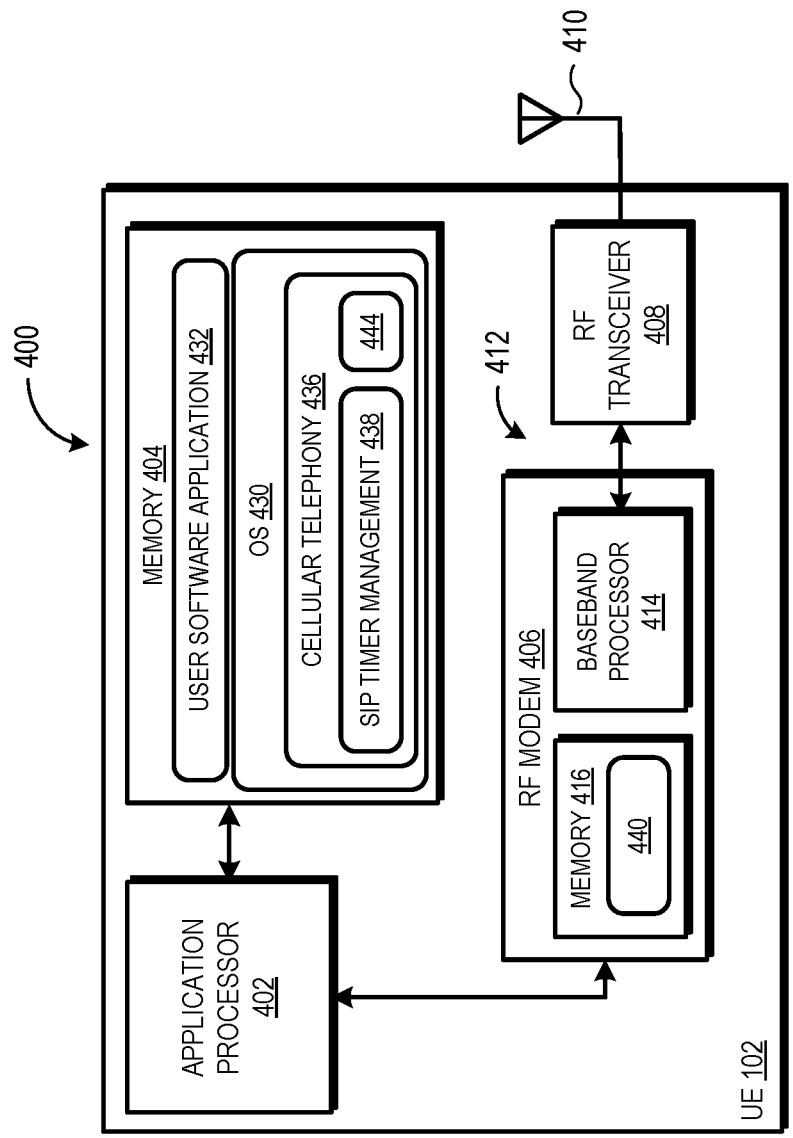
FIG. 4 is a block diagram of a UE of the system of FIG. 1 in accordance with some embodiments.

FIG. 4 illustrates an example hardware implementation 400 of the UE 102 in accordance with some embodiments. In the depicted example, the UE 102 includes at least one application processor 402 (e.g., a central processing unit (CPU) or another general processor), a system memory 404, one or more RF modems 406, one or more RF transceivers 408, and one or more antenna arrays 410 suitable for RF signaling and signal processing in one or more frequency bands typically associated with the corresponding RAT (e.g., a 5G NR RAT). Each RF modem 406, RF transceiver 408, and antenna array 410 triplet together supports a corresponding RAT 412. As described above, in embodiments the UE 102 implements multiple RATs 412, which may implement overlapping hardware or separate hardware for each RAT 412. For example, two RATs 412 may share one or more an RF modem 406, an RF transceiver 408, or an antenna array 410. As illustrated, each RF modem 406 includes a baseband processor 414 and a memory 416, which can include, for example, Flash memory, non-volatile random access memory (NVRAM) or other non-volatile memory, or static RAM (SRAM) or dynamic RAM (DRAM) or other volatile memory, or a combination thereof. Further, it will be appreciated that the UE 102 can include a number of additional components omitted from FIG. 4 for ease of illustration including, for example, one or more displays, one or more touchscreens, keypads, mice, touchpads, microphones, speakers, and other user input/output devices, one or more sensors, batteries or other power sources, graphical processing units (GPUs) or other coprocessors, and the like.

The application processor 402 executes executable instructions from a software stack that includes an operating system (OS) 430 and one or more user software applications, such as user software application 432, and which further can include protocol stacks executed by the baseband processor 414 of the RF modem(s) 406. The OS 430, through manipulation of the application processor 402, manages the general operation of the various hardware components of the UE 102 as well as supports the execution of the one or more user software applications, with the executable instructions representing the OS 430 and the user software application typically accessed from system memory 404 for execution by the application processor 402. The modules of the OS 430 thus include a cellular telephony module 436 for controlling or facilitating the higher-level cellular-related operations of the UE 102, including subscriber identity management, initiation, control, and tear-down of cellular connections (including SIP messaging and RRC messaging), authentication, interfacing between cellular connections and the user software applications, and the like. Further, the memory 416 of the RF modem 406 stores one or more protocol stacks 440 for a corresponding cellular standard. Each protocol stack 440 stores executable instructions that, when executed by the baseband processor 414, manipulate the baseband processor 414 to perform various operations in accordance with a RAT protocol or other communication protocol associated with the air interface provided by the network for which the UE 102 is attempting to establish a communication link. As is well known, such operations typically are associated with the lower-level layers of a network protocol, such as some or all of the physical, data link, and network layers, while the OS 430 and the user software applications support the higher-level layers of the network protocol, such as the transport, session, presentation, and application layers. In at least one embodiment, the cellular telephony module 436 includes a SIP timer management module 438 configured to manage a set of SIP timers utilized by the cellular telephony module 436. This set includes SIP timers that are associated with call setup and call maintenance, and include an invite delay timer 444 that is used as the invite delay timer for the selective call initiation delay processes described above. Accordingly, the cellular telephony module 436 includes one or more sets of executable instructions that, when executed by at least the application processor 402 individually or in combination with the execution of the OS 430 and/or other software of the UE 102, cause the application processor 402 to control other hardware components of the UE 102 to perform one or more implementations of the selective call initiation process described above.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)). The executable instructions stored on the non-transitory computer-readable storage medium may be in source code, assembly language code, object code, or another instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method implemented at a user equipment (UE), the method comprising:
   detecting user initiation of a call during a handover process to attempt to switch the UE from a first network to a second network; and
   selectively delaying an initial transmission of a call initiation message from the UE responsive to detecting the user initiation of the call during the handover process, the selectively delaying comprising:
      starting a timer of a predetermined duration responsive to detecting the user initiation of the call during the handover process, and
      refraining from transmitting the initial transmission of the call initiation message while the handover process is not completed or the timer has not expired.

2. The method of claim 1, further comprising:
   responsive to the handover process completing prior to the timer expiring or responsive to the timer expiring prior to the handover process completing, transmitting the initial transmission of the call initiation message over a current network to which the UE is attached.

3. The method of claim 1, wherein the predetermined duration is set longer than an expected duration of the handover process.

4. The method of claim 1, further comprising:
   responsive to the handover process completing prior to the timer expiring and responsive to determining that the handover process was successful, verifying that an Internet Protocol Multimedia Subsystem (IMS) re-attach process has been performed for the second network prior to transmitting the initial transmission of the call initiation message.

5. The method of claim 1, wherein the initial transmission of the call initiation message comprises a Session Initiation Protocol (SIP) INVITE message.

6. The method of claim 5, wherein the call is an Internet Protocol Multimedia Subsystem (IMS) call.

7. The method of claim 6, wherein the call is at least one of a voice call or a video call.

8. The method of claim 1, wherein the first network is a wireless local area network and the second network is a cellular network.

9. A user equipment (UE), comprising:
   one or more radio frequency (RF) modems configured to wirelessly communicate with at least one network;
   one or more processors coupled to the one or more RF modems; and
   at least one memory storing executable instructions, the executable instructions configured to manipulate at least one of the one or more processors or the one or more RF modems to:
      detect user initiation of a call during a handover process to attempt to switch the UE from a first network to a second network; and
      selectively delay an initial transmission of a call initiation message from the UE responsive to detecting the user initiation of the call during the handover process, wherein the initial transmission is selectively delayed by:
         starting a timer of a predetermined duration responsive to detecting the user initiation of the call during the handover process, and
         refraining from transmitting the initial transmission of the call initiation message while the handover process is not completed or the timer has not expired.

10. The user equipment of claim 9, wherein the executable instructions are further configured to manipulate the at least one of the one or more processors or the one or more RF modems to:
   responsive to the handover process completing prior to the timer expiring or responsive to the timer expiring prior to the handover process completing, transmit the initial transmission of the call initiation message over a current network to which the UE is attached.

11. The user equipment of claim 9, wherein the predetermined duration is set longer than an expected duration of the handover process.

12. The user equipment of claim 9, wherein the executable instructions are further configured to manipulate the at least one of the one or more processors or the one or more RF modems to:
   responsive to the handover process completing prior to the timer expiring and responsive to determining that the handover process was successful, verify that an Internet Protocol Multimedia Subsystem (IMS) re-attach process has been performed for the second network prior to transmitting the initial transmission of the call initiation message.

13. The user equipment of claim 9, wherein the initial transmission of the call initiation message comprises a Session Initiation Protocol (SIP) INVITE message.

14. The user equipment of claim 13, wherein the call is an Internet Protocol Multimedia Subsystem (IMS) call.

15. The user equipment of claim 14, wherein the call is at least one of a voice call or a video call.

16. The user equipment of claim 9, wherein the first network is a wireless local area network and the second network is a cellular network.

17. A non-transitory computer-readable medium storing one or more sets of executable instructions, the one or more sets of executable instructions configured to manipulate at least one processor of a user equipment to:
   detect user initiation of a call during a handover process to attempt to switch the UE from a first network to a second network; and
   selectively delay an initial transmission of a call initiation message from the UE responsive to detecting the user initiation of the call during the handover process, wherein the initial transmission is selectively delayed by:
      starting a timer of a predetermined duration responsive to detecting the user initiation of the call during the handover process, and
      refraining from transmitting the initial transmission of the call initiation message while the handover process is not completed or the timer has not expired.

18. The non-transitory computer-readable medium of claim 17, wherein the one or more sets of executable instructions configured to further manipulate the at least one processor of a user equipment to:

responsive to the handover process completing prior to the timer expiring or responsive to the timer expiring prior to the handover process completing, transmit the initial transmission of the call initiation message over a current network to which the UE is attached.

19. The non-transitory computer-readable medium of claim 17, wherein the predetermined duration is set longer than an expected duration of the handover process.

* * * * *